United States Patent
Coates et al.

(10) Patent No.: US 10,614,175 B2
(45) Date of Patent: Apr. 7, 2020

(54) SYSTEMS AND METHODS FOR SCREENING AND MATCHING BATTERY CELLS AND ELECTRONICS

(71) Applicant: The Boeing Company, Chicago, IL (US)

(72) Inventors: Dwaine K. Coates, Madison, AL (US); Vincent O. Dominguez, Harvest, AL (US); David E. Hall, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 583 days.

(21) Appl. No.: 14/860,173

(22) Filed: Sep. 21, 2015

(65) Prior Publication Data

US 2017/0083636 A1    Mar. 23, 2017

(51) Int. Cl.
     *G06G 7/48*      (2006.01)
     *G06F 17/50*      (2006.01)
     *H01M 10/42*      (2006.01)

(52) U.S. Cl.
     CPC .......... *G06F 17/50* (2013.01); *H01M 10/425* (2013.01); *H01M 10/4207* (2013.01)

(58) Field of Classification Search
None
See application file for complete search history.

(56) References Cited

U.S. PATENT DOCUMENTS

| 6,160,702 A | 12/2000 | Lee et al. |
| 2009/0157369 A1* | 6/2009 | Li .................. G06F 19/701 703/12 |
| 2009/0268415 A1 | 10/2009 | Anupindi et al. |

(Continued)

FOREIGN PATENT DOCUMENTS

| CN | 1248070 A | 3/2000 |
| CN | 104254855 A | 12/2014 |

OTHER PUBLICATIONS

Xue, Nansi, et al. "Design of a lithium-ion battery pack for PHEV using a hybrid optimization method." Applied Energy 115 (2014): 591-602.*

(Continued)

*Primary Examiner* — Rehana Perveen
*Assistant Examiner* — Nithya J. Moll
(74) *Attorney, Agent, or Firm* — Alston & Bird LLP

(57) ABSTRACT

A method, system, and a computer readable medium enables determining a design layout of a battery that includes an electrical arrangement of one or more battery cells and one or more electrical components. The method also includes determining operational parameters of a batch of battery cells and electrical components to potentially be used in the battery and selecting at least one battery cell and at least one electrical component for the electrical arrangement of the design layout. The method further includes comparing the operational parameters of the at least one battery cell and at least one electrical component and determining that the operational parameters of the at least one battery cell and at least one electrical component are within a predetermined threshold. The method includes selecting the at least one battery cell and at least one electrical component as a potential combination for the design.

27 Claims, 8 Drawing Sheets

(56) References Cited

U.S. PATENT DOCUMENTS

2011/0301931 A1* 12/2011 Gering .............. G01R 31/3679
703/13
2012/0046776 A1 2/2012 Zhang et al.
2013/0257382 A1 10/2013 Field et al.
2016/0093848 A1* 3/2016 DeKeuster .......... H01M 2/1077
429/71

OTHER PUBLICATIONS

Gong, Xianzhi, Rui Xiong, and Chunting Chris Mi. "Study of the characteristics of battery packs in electric vehicles with parallel-connected lithium-ion battery cells." IEEE Transactions on Industry Applications 51.2 (2015): 1872-1879.*

Extended European Search Report for EP Appl. No. 16189408.4 dated Mar. 16, 2017.

Severino, B. et al., "Multi-objective Optimal Design of Lithium-ion Battery Based on Evolutionary Algorithm," Journal of Power Sources, vol. 267, May 28, 2014, pp. 288-299.

Office Action for European Application No. 16189408.4 dated Oct. 1, 2018, 6 pages.

Gong, X. et al., "Study of the Characteristics of Battery Packs in Electric Vehicles with Parallel-Connected Lithium-Ion Battery Cells." Industry Application IEEE Transactions, Mar. 20, 2014, pp. 3218-3224.

Office Action for Chinese Application No. 2016108317856 dated Dec. 23, 2019, 18 pages.

* cited by examiner

SYSTEMS AND METHODS FOR SCREENING AND MATCHING BATTERY CELLS AND ELECTRONICS

BACKGROUND

Currently, large-scale batteries can be construed of individual battery cells and electrical components coupled in various electrical arrangements. The large-scale batteries can be formed of modular sub-units consisting of commercial off-the-shelf (COTS) battery cells. The approach of using small cells in large batteries results in a total cell count of hundreds or thousands of cells in the battery. Battery performance, however, can be affected due to variations in individual cell and other battery component performance.

SUMMARY

Aspects of the present disclosure concern a method that includes determining a design layout of a battery. The design layout includes an electrical arrangement of one or more battery cells and one or more electrical components to produce a desired performance of the battery. The method also includes determining operational parameters of a batch of battery cells and electrical components to potentially be used in the battery. Additionally, the method includes selecting, from the batch of battery cells and electrical components, at least one battery cell and at least one electrical component for the electrical arrangement of the design layout. The method further includes comparing the operational parameters of the at least one battery cell and at least one electrical component. Also, the method includes determining, based at least partially on the comparison, that the operational parameters of the at least one battery cell and at least one electrical component are within a predetermined threshold. The method includes selecting the at least one battery cell and at least one electrical component as a potential combination for the design layout. Additionally, the method includes providing an indication of the potential combination.

Additionally, aspects of the present disclosure concern a system that includes one or more memory devices storing instructions, and one or more processors coupled to the one or more memory device. The one or more processors can be configured to execute the instructions to perform a method. The method includes determining a design layout of a battery. The design layout includes an electrical arrangement of one or more battery cells and one or more electrical components to produce a desired performance of the battery. The method also includes determining operational parameters of a batch of battery cells and electrical components to potentially be used in the battery. Additionally, the method includes selecting, from the batch of battery cells and electrical components, at least one battery cell and at least one electrical component for the electrical arrangement of the design layout. The method further includes comparing the operational parameters of the at least one battery cell and at least one electrical component. Also, the method includes determining, based at least partially on the comparison, that the operational parameters of the at least one battery cell and at least one electrical component are within a predetermined threshold. The method includes selecting the at least one battery cell and at least one electrical component as a potential combination for the design layout. Additionally, the method includes providing an indication of the potential combination.

Additionally, aspects of the present disclosure concern a non-transitory computer readable medium storing instructions that cause one or more processor to perform a method. The method that includes determining a design layout of a battery. The design layout includes an electrical arrangement of one or more battery cells and one or more electrical components to produce a desired performance of the battery. The method also includes determining operational parameters of a batch of battery cells and electrical components to potentially be used in the battery. Additionally, the method includes selecting, from the batch of battery cells and electrical components, at least one battery cell and at least one electrical component for the electrical arrangement of the design layout. The method further includes comparing the operational parameters of the at least one battery cell and at least one electrical component. Also, the method includes determining, based at least partially on the comparison, that the operational parameters of the at least one battery cell and at least one electrical component are within a predetermined threshold. The method includes selecting the at least one battery cell and at least one electrical component as a potential combination for the design layout. Additionally, the method includes providing an indication of the potential combination.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1:
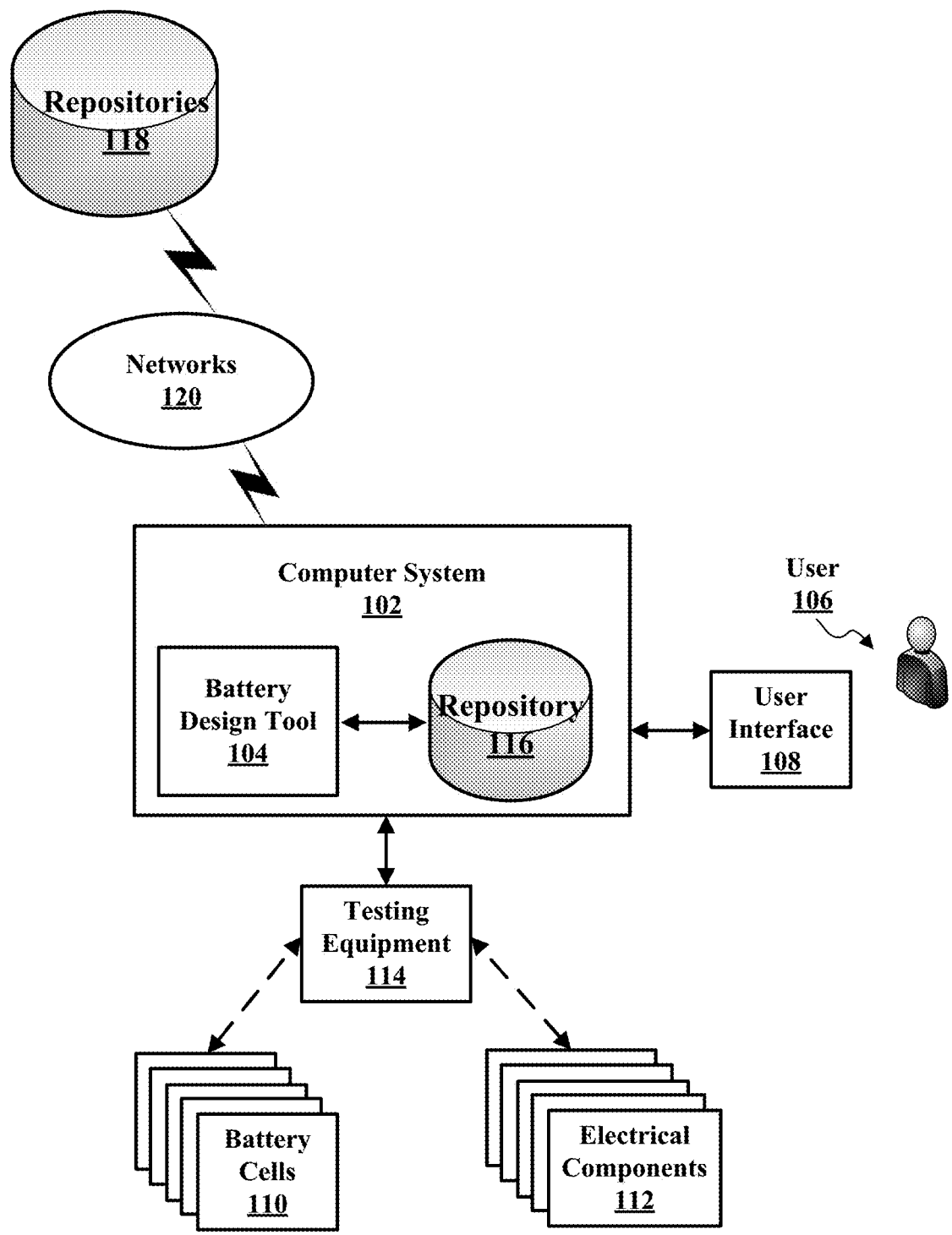
FIG. 1 illustrates an example of a testing environment and computer system that includes a battery design tool, according to various aspects of the present disclosure.

FIG. 1 illustrates a testing environment 100 in which a battery layout can be tested and determined, according to aspects of the present disclosure. While FIG. 1 illustrates various components contained in the testing environment 100, FIG. 1 illustrates one example of a testing environment and additional components can be added and existing components can be removed.

As illustrated in FIG. 1, the testing environment 100 can include a computer system 102. The testing environment 100 can represent the computer systems and network hardware of public or private entities, such as governmental agencies, individuals, businesses, partnerships, companies, corporations, etc., utilized to support the entities. The computer system 102 can be any type of conventional computer systems that is operating in the testing environment 100 or supporting the testing environment 100. For example, the computer system 102 can include various types of servers, such as file servers, web servers, application servers, database servers, email servers and the like, that provide services within the testing environment 100. Likewise, for example, the computer system 102 can include laptop computers, desktop computers, tablet computers, mobile phones, and the like used by the personnel of the entities.

Additionally, for example, the testing environment 100 can include other hardware and computer systems that support the testing environment 100. For example, the testing environment 100 can include gateways, routers, wireless access points, firewalls, and the like that support any type of communications networks to allow the computing systems in the testing environment 100 to communicate. In any of the examples, the computer systems, including the computer system 102, in the testing environment 100 can include hardware resources, such as processors, memory, network hardware, storage devices, and the like, and software resources, such as operating systems (OS), application programs, and the like.

According to aspects of the present disclosure, the computer system 102 can be configured to execute a battery design tool 104. The battery design tool 104 can be configured to screen and match battery cells 110 and electrical components 112 in a battery design that includes multiple battery cells and electrical components. The battery design tool 104 can be configured to determine operational parameters of the battery cells 110 and the electrical components 112 and match those battery cells 110 and electrical components 112 that exhibit similar operational parameters. In aspects, the battery design tool 104 can be configured as a software program that is capable of being stored on and executed by the computer system 102. The battery design tool 104 can be written in a variety of programming languages, such as JAVA, C++, Python code, Visual Basic, hypertext markup language (HTML), extensible markup language (XML), and the like to accommodate a variety of operating systems, computing system architectures, etc.

The battery design tool 104 can be configured to operate, at least partially, under the control of a user 106. To receive input and output results to the user 106, the battery design tool 104 can be configured to generate and provide a user interface 108. The user interface 108 can be any type of command line and/or graphical user interface (GUI) that allows the user 106 to interact with the battery design tool 104. The battery design tool 104 can be configured to provide, via the user interface 108, controls, forms, reports, etc., to allow the user 106 to interact with the battery design tool 104 and perform the processes described herein.

In aspects, the operational parameters utilized by the battery design tool 104 can include any information and metrics that describe an actual operational performance of the battery cells 110 and the electrical components 112. For example, the operational parameters of the battery cells can include ampere-hour rating of the battery cell, internal resistance of the battery, the open circuit voltage of the battery, state of charge of the battery, etc. For example, the operational parameters of the electrical components can include equivalent resistance at different temperatures and impedance at different temperatures. To determine the operational parameters, the computer system 102 can be coupled to testing equipment 114. The testing equipment 114 can include electronics and circuits that place the battery cells 110 and the electrical components 112 under real-world operational conditions. The testing equipment 114 can also include one or more sensors that measure the operational parameters of the battery cells 110 and the electrical components 112 under the real-world operational conditions. Additionally, for example, the operational parameters can also include parameters calculated from the measured data such as IR trends and capacity trends.

In aspects, the computer system 102 can include a repository 116. The repository 116 can be configured to store data utilized by the battery design tool 104. For example, the repository 116 can store the operational parameters determined by the battery design tool 104 utilizing the testing equipment 114. Likewise, for example, the repository 116 can store databases that include an inventory of battery cells 110 and the electrical components 112, and details of the battery cells 110 and the electrical components 112 such as identification of each of the battery cells 110 and electrical components 112 (e.g. serial number), the specifications of the battery cells 110 and the electrical components 112, and theoretical operational parameters of the battery cells 110 and the electrical components 112 (e.g. manufacturer designated operational parameters).

In aspects, the computer system 102 can be coupled to one or more repositories 118 via one or more networks 120. For example, the repositories 118 can be operated and maintained by manufactures of the battery cells 110 and the electrical components 112. The battery design tool 104 can be configured to retrieve, via a network 120, details of the battery cells 110 and the electrical components 112 from the repositories 118. The network 120 can be any type of network whether public or private. The repository 118 can be any type of computer system that stores information about contracts.

Figure 2:
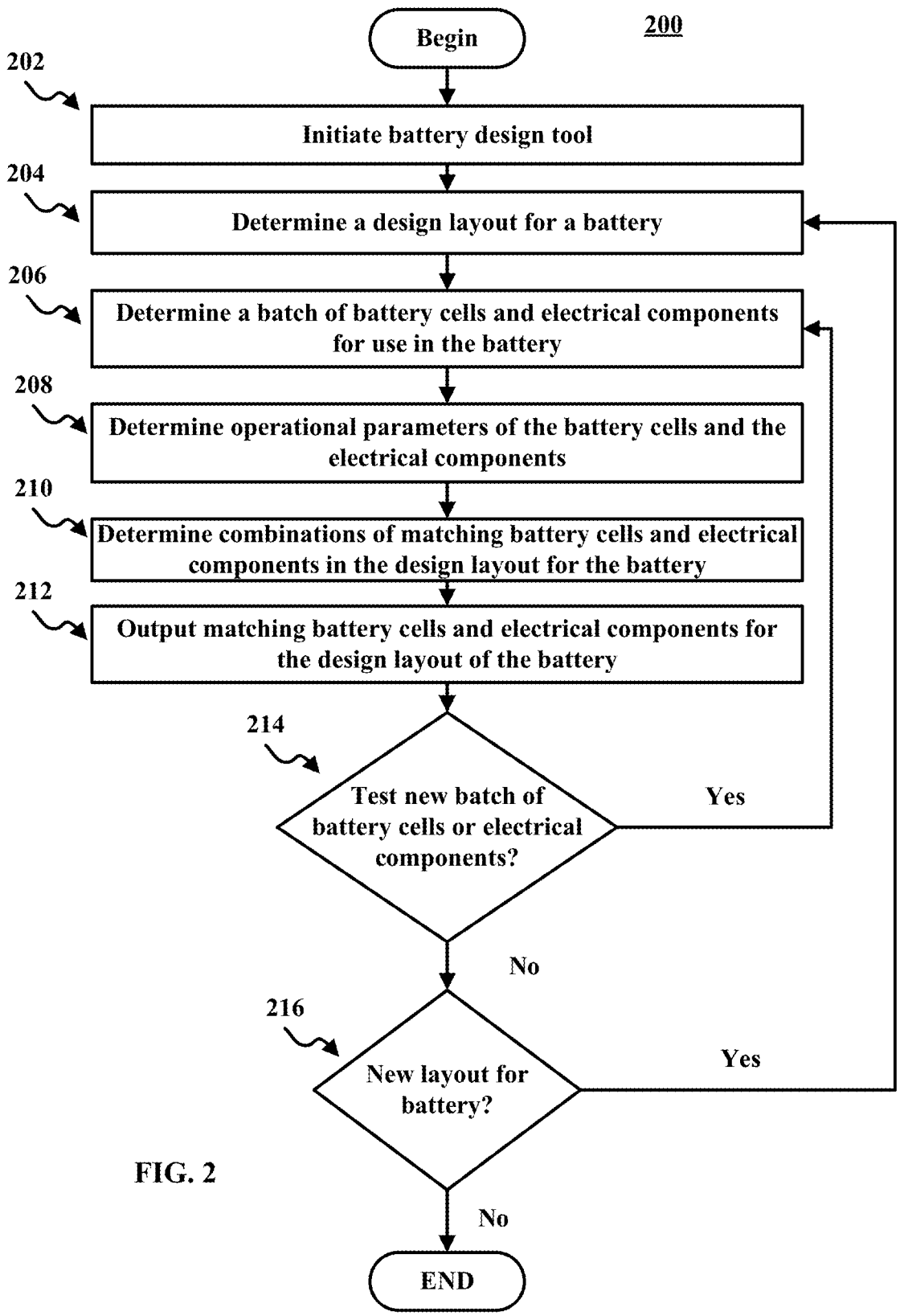
FIG. 2 illustrates an example of a process of designing a battery, according to various aspects of the present disclosure.

FIG. 2 illustrates one example of a process 200 for designing a battery from battery cells and electrical components, according to aspects of the present disclosure. While FIG. 2 illustrates various stages that can be performed, stages can be removed and additional stages can be added. Likewise, the order of the illustrated stages can be performed in any order.

After the process begins, in 202, the battery design tool can be initiated. For example, the user 106 can initiate execution of the battery design tool 104 on the computer system 102. Once initiated, the battery design tool 104 can provide the user interface 108 to the user 106. The user interface 108 can allow the user 106 to operate the battery design tool 104.

In 204, the battery design tool 104 can determine a design layout for a battery. For example, the user 106 can input, via the user interface 108, a design layout for a battery. Likewise, for example, the user 106 can input requirements for the battery, and the battery design tool 104 can automatically generate a design layout for a battery. Likewise, for example, the battery design tool 104 can provide, via the user interface 108, a circuit design interface that allows the user 106 to design the layout for the battery. Likewise, for example, the battery design tool 104 can store one or more design layouts for different battery configurations and the user 106 can select one or more of the stored design layouts.

In aspects, the design layout for a battery can include a circuit diagram that is composed of battery cells and electrical components to provide a desired performance for the battery. For example, the circuit diagram can include battery cells and electrical components in various electrical arrangements (e.g. series and parallel circuit configurations) to provide a desired performance for the battery (e.g. a desired output voltage, current, lifetime, etc.)

In 206, the battery design tool can determine a batch of battery cells and electrical components. For example, the battery design tool 104 can select a plurality of battery cells and electrical components to test and screen that match the design layout of the battery. In some aspects, the batch of battery cells and electrical components can include a number of battery cells and/or electrical components that is larger than the number of battery cells and/or electrical components required for the design layout for the battery. This can allow the design tool to find best matches of battery cells and electrical components for the battery and potentially reject one or more battery cells and/or electrical components that do not match operational parameters.

In 208, the battery design tool can determine operational parameters of the battery cells and the electrical components. For example, the battery design tool 104 can communicate with the testing equipment 114 to determine the operational parameters of the battery cells and electrical components, e.g., the battery cells 110 and the electrical components 112. Likewise, for example, the battery design tool 104 may have previously tested the battery cells and electrical components and can retrieve the operational parameters for the battery cells and electrical components that were previously tested.

In 210, the battery design tool can determine combinations of matching battery cells and electrical components in the design layout for the battery. For example, in aspects, the battery design tool 104 can compare the operational parameters of the battery cells and the electrical components. Based on the comparison, the battery design tool 104 can determine which of the battery cells and the electrical components have similar operational parameters. Those battery cells and electrical components that have similar operational parameters can be selected as a combination of potential combination of battery cells and electrical components.

For example, the battery design tool 104 can examine the design layout of the battery and determine those battery cells and electrical components that are contained within related electrical circuits within the design layout, for example, those battery cells and electrical components that are coupled in series, coupled in parallel, etc. For the battery cells and electrical components that are within the related electrical circuits, the battery design tool 104 can compare the operations parameters of battery cells and electrical components in the selected batch and determine one or more battery cells and electrical components that have similar operational parameters. In some aspects, for example, the battery design tool 104 can select one or more battery cells and electrical components with operational parameters that are within a predetermined threshold. Those battery cells and electrical components that have operational parameters within the predetermined threshold can be selected as a combination of potential combination of battery cells and electrical components.

In some aspects, the battery design tool 104 can compare the operational parameters that are determined with the testing equipment 114. In some aspects, the battery design tool 104 can determine how much the operational parameters, which are determined with the testing equipment 114, deviate from the theoretical performance of the battery cells and electrical components. For instance, the battery design tool 104 can determine one or more statistical measures of the deviation of the operational parameters from the theoretical performance (e.g., standard deviation). In some aspects, the battery design tool 104 can utilize the deviation of operational parameters in determining potential combinations of battery cells and electrical components.

In some aspects, the battery design tool 104 can select one or more combinations of battery cells and electrical components that can be potential utilized for each battery cell and electrical component specified in the design layout for the battery. The battery design tool 104 can denote the potential combination of one or more battery cells and electrical components by associating the identification (e.g. serial number) of the potential one or more battery cells and electrical components with specific battery cells and electrical components in the design layout. In some aspects, the battery design tool 104 can select one potential combination of battery cells or electrical components for the design layout for the battery. In some aspects, the battery design tool 104 can select multiple combination of battery cells and electrical components that can be potentially used in the design layout for the battery In 212, the battery design tool can output matching battery cells and electrical components for the design layout of the battery. For example, in aspects, the battery design tool 104 can output the identification of battery cells and electrical components that may be potentially used for the components of the design layout of the battery. In some aspects, the battery design tool 104 can output a list of identifications (e.g. serial numbers) of potential battery cells and electrical components and indication of the potential location in the design layout. In some aspects, the battery design tool 104 can output the design layout that includes identifications (e.g. serial numbers) of potential battery cells and electrical components recorded on the design layout.

In the process 200, the design tool can perform the matching process for different batches of battery cells and electrical components. In 214, the design tool can determine whether to test a new batch of battery cells or electrical components. If a new batch is to be tested, the process 200 can return to 206 and repeat the process of matching battery cells and electrical components. If a new batch is not tested, the process 200 can proceed to 216.

In 216, the design tool can perform the matching process for different design layouts for the battery. In 216, the design tool can determine whether to test a new design layout for the battery. If a new design layout is to be tested, the process 200 can return to 204. If a new design layout is not tested, the process can end.

Figure 3A:
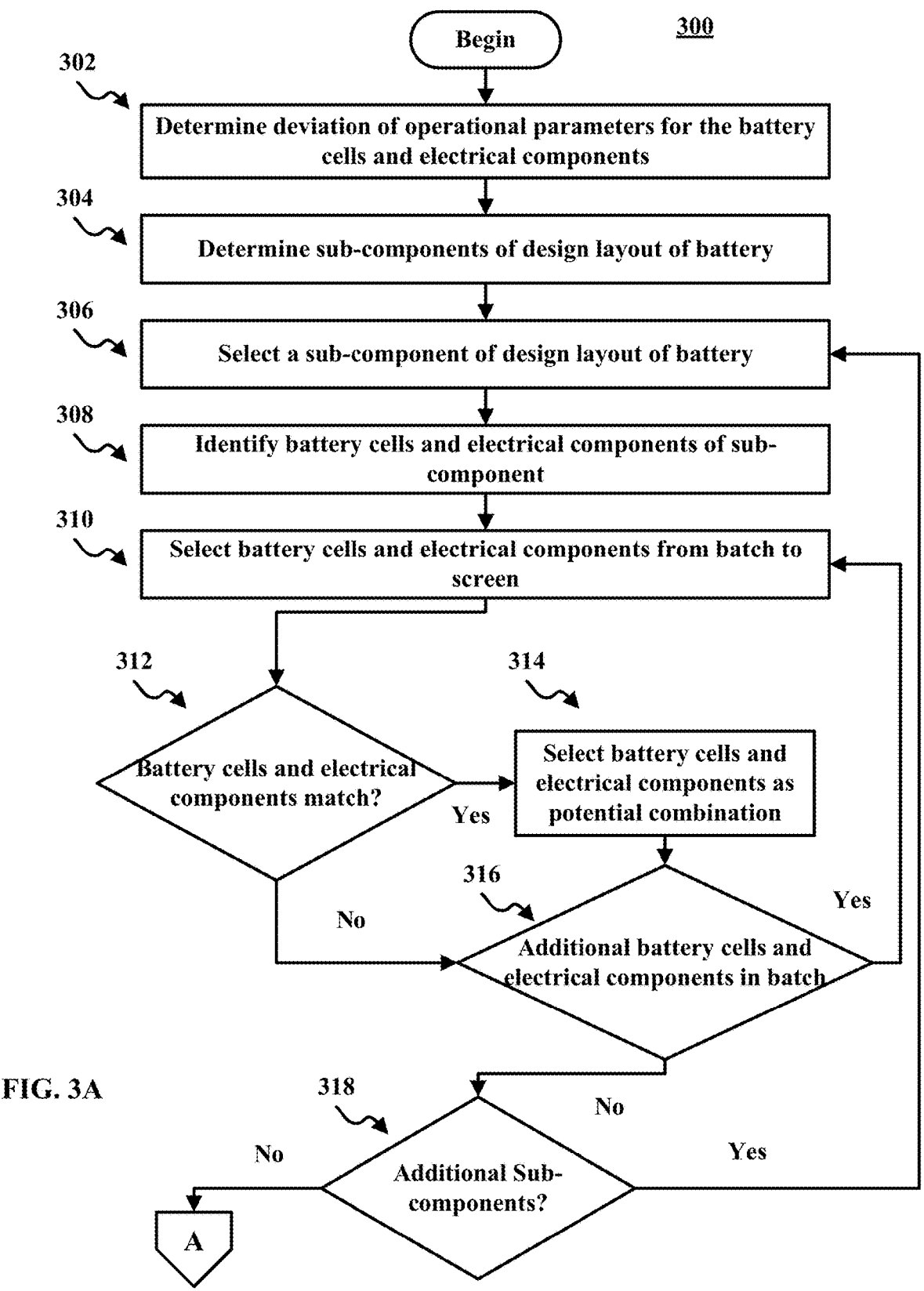
FIGS. 3A and 3B illustrate an example of a process of matching battery cells and electrical components in a battery design process, according to various aspects of the present disclosure.
Figure 3B:
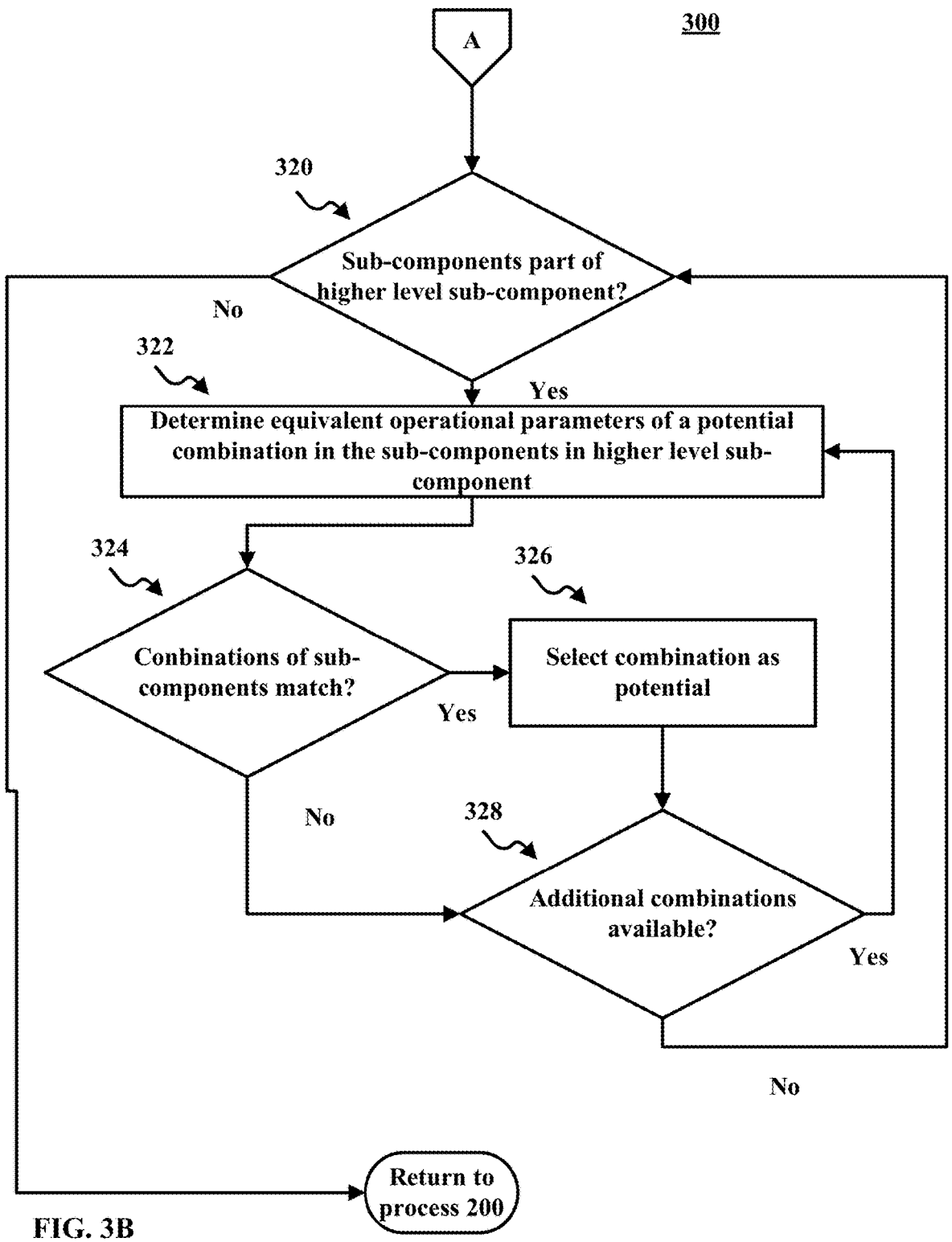

According to aspects, the process 200 can match battery cells and electrical components based on an iterative process. FIGS. 3A and 3B illustrate one example of a process 300 matching battery cells and electrical components, according to aspect of the present disclosure. While FIGS. 3A and 3B illustrate various stages that can be performed, stages can be removed and additional stages can be added. Likewise, the order of the illustrated stages can be performed in any order.

In 302, the battery design tool can determine deviations of the operational parameters for the battery cells and the electrical components. For example, in aspects, the battery design tool 104 can compare the operational parameters to theoretical performance of the battery cells and the electrical components. For instance, the battery design tool 104 can determine one or more statistical measures of the deviation of the operational parameters from the theoretical performance (e.g., standard deviation).

For example, the battery design tool 104 can plot the data recorded from the testing equipment 114. The battery design tool 104 can perform one or more mathematical analysis (e.g. best fit algorithm) to determine the operational parameters of the battery cells and the electrical components such as IR trends and capacity trends. The battery design tool 104 can then perform a statistical analysis on the operational parameters compared to the theoretical performance (e.g., performance data provided by the manufacturer) to determine the standard deviation of the operational parameters of each battery cell and electrical component.

In 304, the battery design tool can determine sub-components of the design layout for the battery. For example, in some aspects, the battery design tool 104 can examine the design layout for the battery and determine battery cells and electrical components that are grouped together in related electrical configurations that influence the performance of each other. For instance, a sub-component can include one or more battery cells and electrical components coupled in series, one or more battery cells and electrical components coupled in parallel, and the like.

Figure 4A:
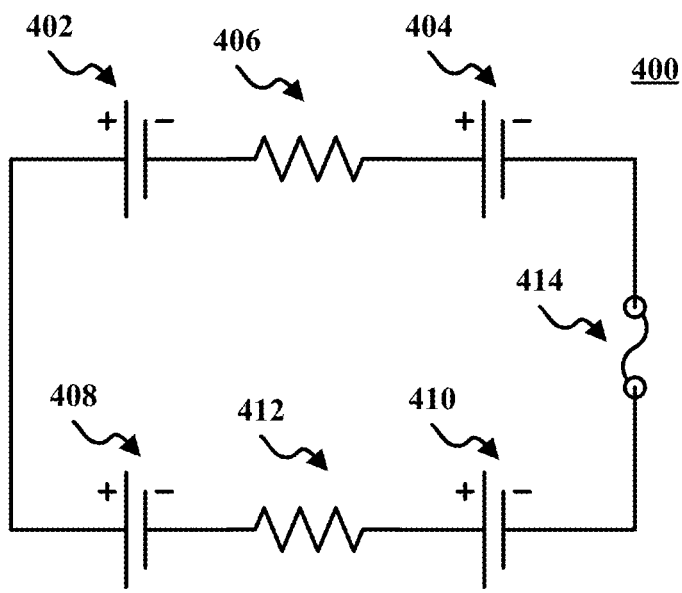
FIGS. 4A-4C illustrates examples of a design layout for a battery, according to various aspects of the present disclosure.
Figure 4B:
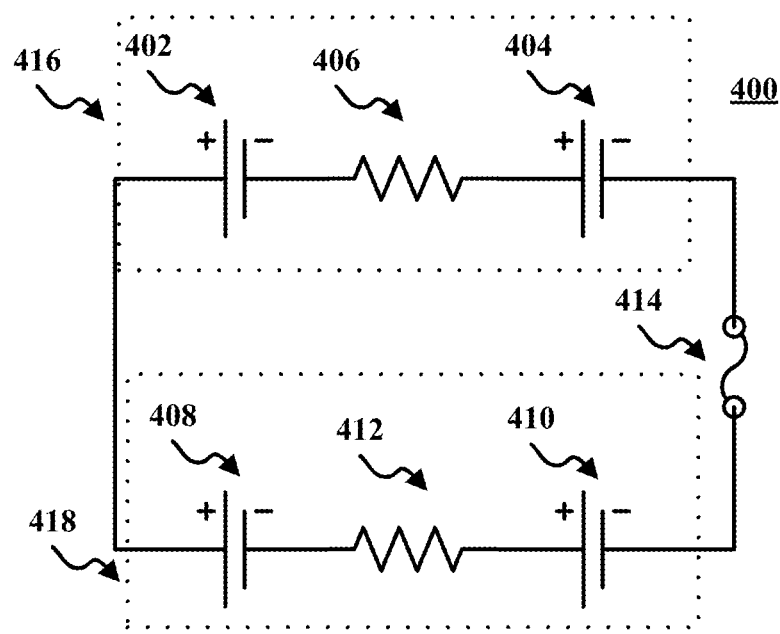
Figure 4C:
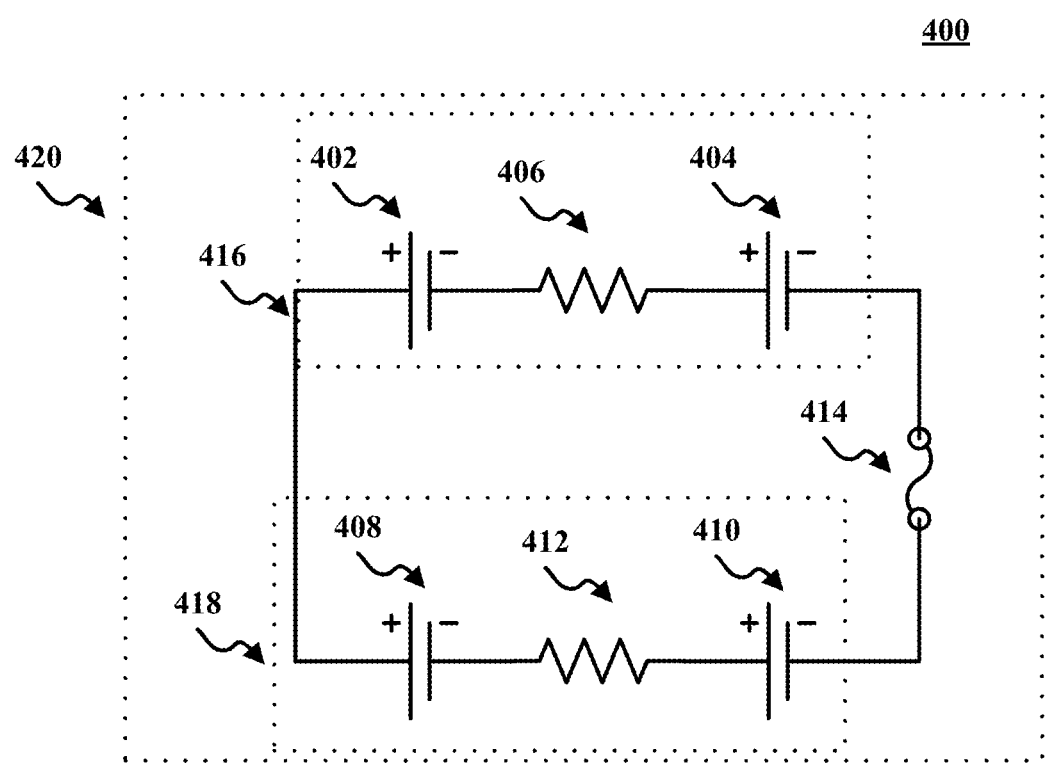

FIGS. 4A-4C illustrate an example of a design layout 400 according to aspects of the present disclosure. For example, as illustrated in FIG. 4A, the design layout 400 can include a battery cell 402, a battery cell 404, and a resistor 406 coupled in series. The design layout 400 can include a battery cell 408, a battery cell 410, and a resistor 412 coupled in series. As illustrated in FIG. 4B, the battery cell 402, the battery cell 404, and the resistor 406 coupled in series can be a sub-component 416. The battery cell 408, the battery cell 410, and the resistor 412 coupled in series can be a sub-component 418. The sub-component 416 and the sub-component 418 can be coupled in parallel with a fuse 414.

In 306, the battery design tool can select a sub-component of the design layout of the battery. For example, referring to FIG. 4B, the battery design tool 104 can select sub-component 416 to test. In 308, the battery design tool can identify battery cells and electrical components of the sub-component of the design layout that was selected. For example, referring to FIG. 4B, the battery design tool 104 can identify that the sub-component 416 includes the battery cell 402, the battery cell 404, and the resistor 406.

In 310, the battery design tool can select a combination of battery cells and electrical components from the batch to screen. For example, in aspects, the battery design tool 104 can select one battery cell and electrical component for each battery cell and electrical component in the sub-component. For example, referring to FIG. 4B, the battery design tool 104 can select a combination of two battery cells and one resistor to screen for the battery cell 402, the battery cell 404, and the resistor 406 of the sub-component 416.

In 312, the battery design tool can determine if the combination of battery cells and electrical components, that were selected, match. For example, in aspects, the battery design tool 104 can compare the operational parameters of the battery cells and the electrical components in the combination or the deviation of the operation parameters. Based on the comparison, the battery design tool 104 can determine if the combination of battery cells and electrical components can be potentially used in the sub-component. For example, the battery design tool 104 can determine that the combination of battery cells and the electrical components match if the operational parameters of the combination of battery cells and the electrical components or the deviation of the operation parameters are within a predetermine threshold.

For example, referring to FIG. 4B, the battery design tool 104 can compare the standard deviation of one or more operational parameters of the two battery cells and the one resistor selected for the battery cell 402, the battery cell 404, and the resistor 406 of the sub-component 416. If the standard deviations are within a predetermined threshold (e.g., one (1) standard deviation), the battery design tool 104 can determine that the combination of selected two battery cells and the one resistor match.

In 314, if combination of the battery cells and electrical components match, the battery design tool can select the combination of battery cells and the electrical components as a potential combination of battery cells and electrical components for the sub-component. The battery design tool 104 can denote the potential combination of battery cells and electrical components by associating the identification (e.g. serial number) of the potential one or more battery cells and electrical components in the combination with specific battery cells and electrical components in the design layout.

For example, referring to FIG. 4B, the battery design tool 104 can determine that combination of the selected two battery cells and the one resistor have deviations that are within the predetermined threshold. The battery design tool 104 can record that the combination as a potential combination for sub-component 416.

In 316, the battery design tool can determine if additional battery cells and electrical components are in the batch to screen for the sub-component. If additional battery cells are available, for example, the battery design tool 104 can select a new battery cell or electrical component from the batch to create a new combination for the sub-component. The battery design tool 104 can screen the new combination with the newly selected battery cell or electrical component. The battery design tool 104 can return to 310 to screen new combination with the newly selected battery cell or electrical component. In some aspects, the battery design tool 104 can continue to create new combinations and screen combinations of battery cells and electrical components whether or not matching battery cells or electrical components were determined in a previous iteration. This allows the battery design tool 104 to determine multiple combinations of battery cells and electrical components that can potential be used in the sub-component.

In 318, the battery design tool can determine if additional sub-components need to be tested. If additionally sub-components need to be tested, the battery design tool 104 can return to 306 and repeat 306-316 for the remaining sub-components. In some aspects, if a battery cell or electrical component was already selected as potential for a sub-component, the battery design tool 104 can remove the battery cell or electrical components from the batch and utilize the remaining battery cells and electrical components for remaining sub-components. In some aspects, the battery design tool 104 can screen each sub-component for the entire batch of battery cells and electrical components. This allows the battery design tool 104 to generate a complete list of possible combinations for each sub-component in the design layout. If all the sub-components have been tested, the battery design tool 104 can proceed to 320.

In 320, the battery design tool can determine if the sub-components are part of a higher level sub-component. In aspects, for example, if the sub-components are part of higher level sub-components, the combinations of the battery cells and electrical components of the sub-components can be screened to ensure that the higher level sub-component performs properly. For example, as illustrated in FIG. 4C, the sub-component 416 and the sub-component 418 can be coupled in parallel with a fuse 414 to form a higher level sub-component 420.

If the sub-components form a higher level sub-component, in 322, the battery design tool can determine equivalent operational parameters for the combination of the sub-components. In aspects, for example, the battery design tool 104 can mathematically combine the operational parameters of battery cells and electrical in a combination to determine an equivalent operation parameter for the combination. For example, the battery design tool 104 can determine statistical measures such as median or mean for the operational parameters or deviations in operational parameters in a combination.

In 324, the battery design tool can determine if the combination for the sub-components in the higher level sub-component. In some embodiments, for example, the battery design tool 104 can compare the equivalent operational parameters of the combination for each sub-component in the higher level sub-component. Based on the comparison, the battery design tool 104 can determine if the combinations for the sub-components can be potentially used in the higher level sub-component. For example, the battery design tool 104 can determine that the combination of battery cells and the electrical components match if the operational parameters of the combination of battery cells and the electrical components or the deviation of the operation parameters are within a predetermine threshold. If the higher level sub-component includes an individual battery cell or electrical component, the battery design tool 104 can select and compare the operational parameters of the individual battery cell or electrical component in the comparison. In 326, if the combination match, the battery design tool can select the combinations as potential combinations.

In 328, the battery design tool can determine if additional combination are available for the sub-components in the higher level sub-component. If additional combinations are available, for example, the battery design tool 104 can select new combinations for the sub-components. The battery design tool 104 can screen the new combinations for the sub-components in the higher level sub-component. The battery design tool 104 can return to 322 to screen new combinations. In some aspects, the battery design tool 104 can continue to screen the combination for the sub-components until all the combination for the sub-components are tested. This allows the battery design tool 104 to determine multiple combinations of sub-components.

After 328, the battery design tool can return to 320 to determine if additional higher level sub-components are in the design layout for the battery. If additionally higher level sub-components need to be tested, the battery design tool 104 can repeat 322-328 for the remaining higher level sub-components. In some aspects, the design layout may include multiple levels of components. The battery design tool 104 can repeat 322-328 for each level of sub-components.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 5:
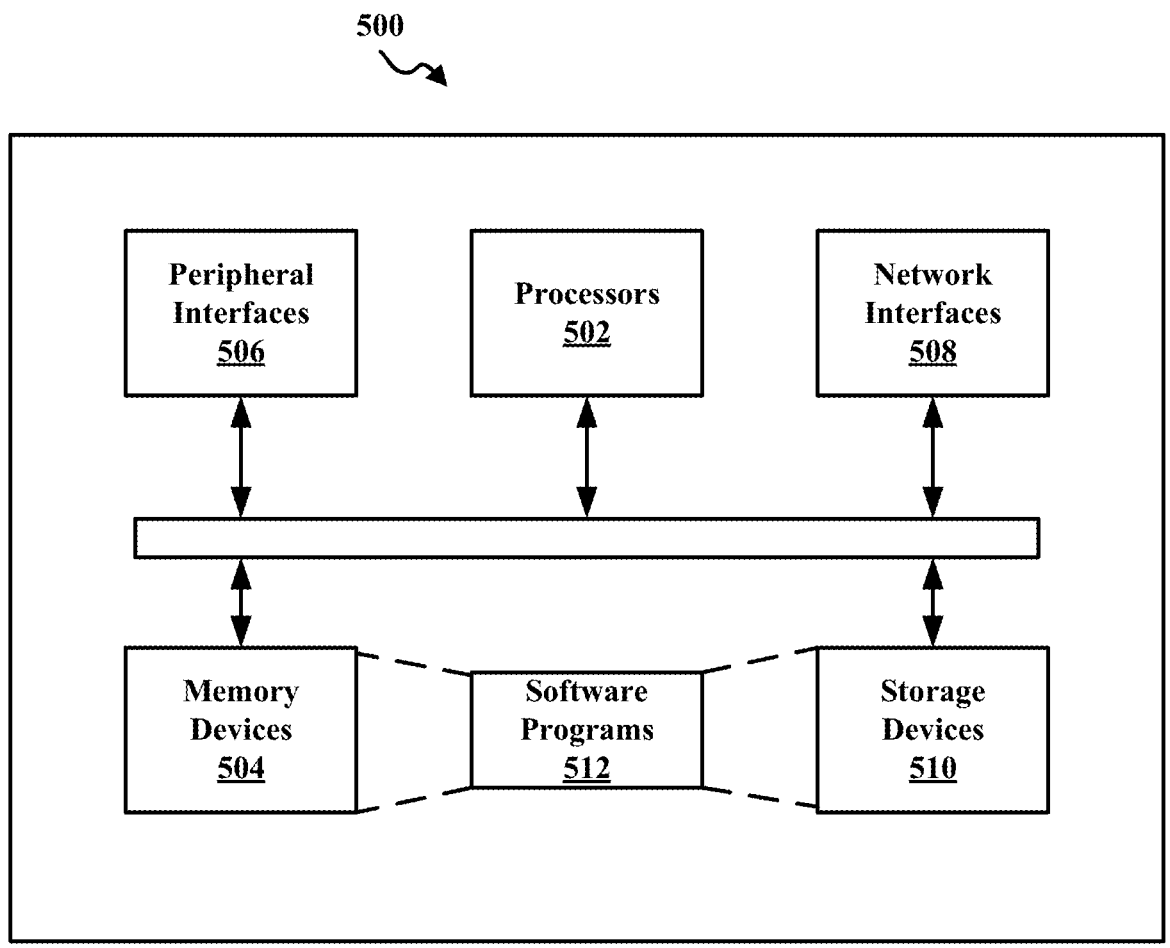
FIG. 5 illustrates an example of a hardware configuration for a computer device, according to various aspects of the present disclosure.

For example, FIG. 5 illustrates an example of a hardware configuration for the computer system 102. While FIG. 5 illustrates various components contained in the computer device 500, FIG. 5 illustrates one example of a computer device and additional components can be added and existing components can be removed.

The computer device 500 can be any type of computer device. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the battery design tool 104 can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, for example the network 120, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality of the battery design tool 104 described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data utilized by one or more software programs 512 can be stored in the one or more memory devices 504 and/or on in the one or more storage devices 510.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Figure 6:
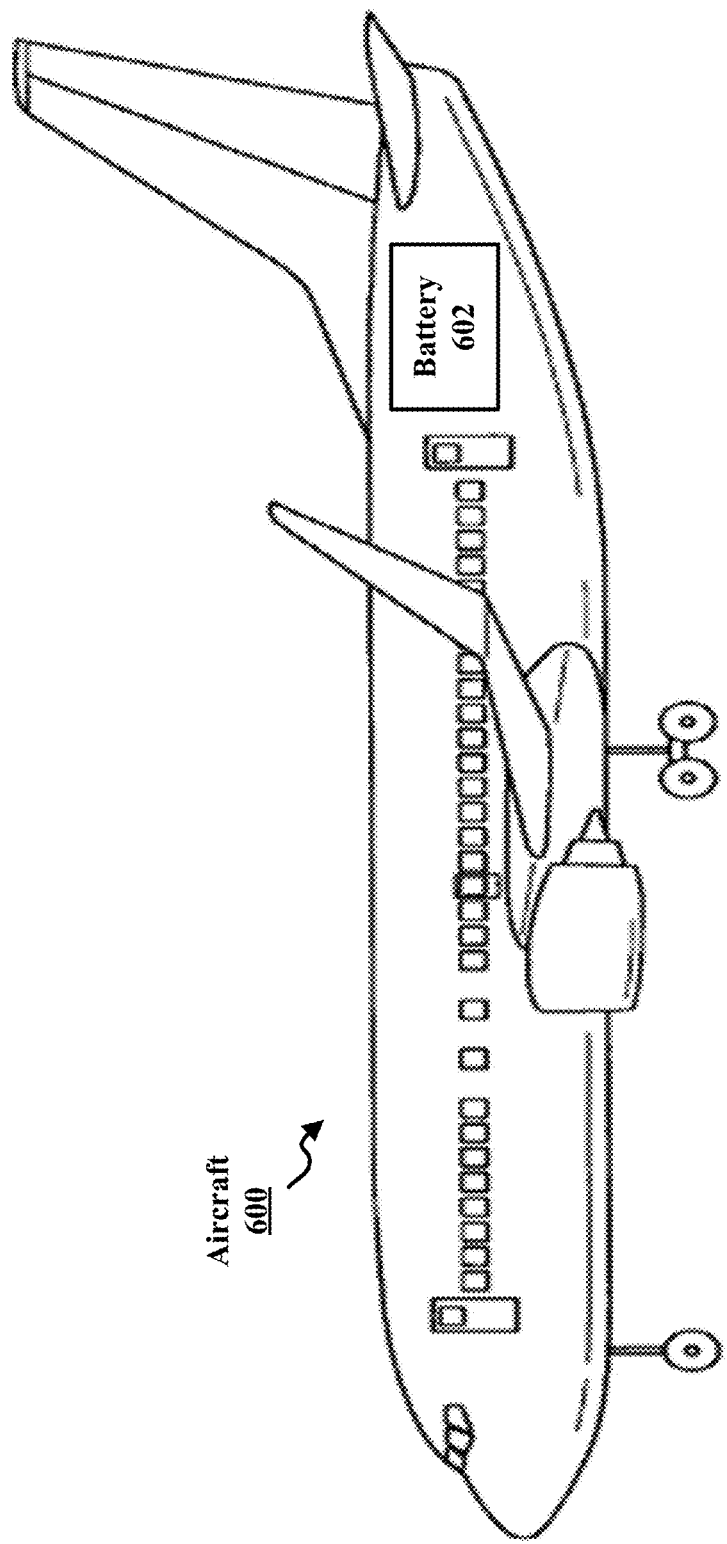
FIG. 6 illustrates an example of an application of the battery design tool, according to various aspects of the present disclosure.

In the aspects described above, the battery design tool 104 can be utilized to determine a design layout for a battery to be used in any type of application. FIG. 6 illustrates one example of an application for the battery design tool 104. As illustrated in FIG. 6, an aircraft 600 can include a battery 602. In aspects, the battery design tool 104 can be utilized to determine the deign layout of the battery 602.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method, comprising:
   determining a design layout of a battery, wherein the design layout comprises an electrical arrangement of one or more battery cells and one or more electrical components, distinct from but electrically connected in the design layout to the one or more battery cells, to produce a desired performance of the battery;
   determining operational parameters of a batch of battery cells and operational parameters of electrical components useable in the battery, wherein determining the operational parameters comprises testing, with testing equipment including one or more sensors, the operational parameters of the battery cells and the operational parameters of the electrical components;
   selecting, from the batch of battery cells and electrical components, at least one battery cell and at least one electrical component for the electrical arrangement of the design layout;
   comparing the operational parameters of the at least one battery cell and the operational parameters of the at least one electrical component;
   determining, based at least partially on the comparison, that the operational parameters of the at least one battery cell and the operational parameters of the at least one electrical component match by each being within a predetermined threshold, wherein determining that the operational parameters of the at least one battery cell and the operational parameters of the at least one electrical component match comprises determining that the operational parameters of the at least one battery cell are within a predefined threshold of the operational parameters of the at least one electrical component in order for the operational parameters of the at least one battery cell to match the operational parameters of the at least one electrical component;
   selecting the at least one battery cell and the at least one electrical component as a first combination for the design layout; and
   providing an indication of the first combination.

2. The method of claim 1, the method further comprising:
   receiving, from a user, the desired performance of the battery; and
   generating the design layout that produces the desired performance of the battery.

3. The method of claim 1, wherein determining the operational parameters further comprises:
measuring the operational parameters of the one or more battery cells and the operational parameters of the one or more electrical components.

4. The method of claim 1, the method further comprising:
determining, for the design layout, a sub-component of the design layout, wherein the sub-component comprises a related electrical arrangement of one or more battery cells and one or more electrical components; and
associating, for the design layout, the potential first combination as the related electrical arrangement of the sub-component.

5. The method of claim 4, wherein the related electrical arrangement comprises at least one of a series circuit or a parallel circuit.

6. The method of claim 4, the method further comprising:
determining, for the design layout, an additional sub-component of the design layout, wherein the additional sub-component comprises a related electrical arrangement of one or more battery cells and one or more electrical components; and
determining a second combination for the additional sub-component.

7. The method of claim 6, the method further comprising:
determining equivalent operational parameters for the first combination and the second combination;
comparing the equivalent operational parameters of the first combination and the second combination;
determining, based at least partially on the comparison, that the equivalent operational parameters of the first combination and the second combination are within a predetermined threshold; and
selecting the first combination for the sub-component and the second combination for the additional sub-component of the design layout.

8. The method of claim 1, wherein the operational parameters comprise a deviation in a real world operation of the battery cells and the electrical components from a theoretical performance of the battery cells and the electrical components.

9. The method of claim 1, further comprising selecting, from the batch of battery cells and electrical components a different combination of at least one battery cell and at least one electrical component and then repeating the comparing of the operational parameters and the determining that the operational parameters of the at least one battery cell and the at least one electrical component of the different combination match, and wherein selecting the at least one battery cell and the at least one electrical component as a first combination for the design layout comprises selecting from among the combinations of the at least one battery cell and the at least one electrical component that match as a first combination for the design layout.

10. The method of claim 1, wherein the operational parameters that are compared and determined to match are a statistical measure of deviation.

11. A system, comprising:
testing equipment including one or more sensors;
one or more memory devices storing instructions; and
one or more processors coupled to the one or more memory devices and configured to execute the instructions to perform operations comprising:
determining a design layout of a battery, wherein the design layout comprises an electrical arrangement of one or more battery cells and one or more electrical components, distinct from but electrically connected in the design layout to the one or more battery cells, to produce a desired performance of the battery;
determining operational parameters of a batch of battery cells and operational parameters of electrical components useable in the battery, wherein determining the operational parameters comprises directing testing, with the testing equipment including the one or more sensors, of the operational parameters of the battery cells and the operational parameters of the electrical components;
selecting, from the batch of battery cells and electrical components, at least one battery cell and at least one electrical component for the electrical arrangement of the design layout;
comparing the operational parameters of the at least one battery cell and the operational parameters of the at least one electrical;
determining, based at least partially on the comparison, that the operational parameters of the at least one battery cell and the operational parameters of the at least one electrical component match by each being within a predetermined threshold, wherein determining that the operational parameters of the at least one battery cell and the operational parameters of the at least one electrical component match comprises determining that the operational parameters of the at least one battery cell are within a predefined threshold of the operational parameters of the at least one electrical component in order for the operational parameters of the at least one battery cell to match the operational parameters of the at least one electrical component;
selecting the at least one battery cell and the at least one electrical component as a first combination for the design layout; and
providing an indication of the first combination.

12. The system of claim 11, wherein the operations further comprise:
receiving, from a user, the desired performance of the battery; and
generating the design layout that produces the desired performance of the battery.

13. The system of claim 11, wherein determining the operational parameters further comprises:
measuring the operational parameters of the one or more battery cells and the operational parameters of the one or more electrical components.

14. The system of claim 11, wherein the operations further comprise:
determining, for the design layout, a sub-component of the design layout, wherein the sub-component comprises a related electrical arrangement of one or more battery cells and one or more electrical components; and
associating, for the design layout, the potential first combination as the related electrical arrangement of the sub-component.

15. The system of claim 14, wherein the related electrical arrangement comprises at least one of a series circuit or a parallel circuit.

16. The system of claim 14, the operations further comprise:
determining, for the design layout, an additional sub-component of the design layout, wherein the additional sub-component comprises a related electrical arrangement of one or more battery cells and one or more electrical components; and
determining a second combination for the additional sub-component.

17. The system of claim 16, wherein the operations further comprise:
determining equivalent operational parameters for the first combination and the second combination;
comparing the equivalent operational parameters of the first combination and the second combination;
determining, based at least partially on the comparison, that the equivalent operational parameters of the first combination and the second combination are within a predetermined threshold; and
selecting the first combination for the sub-component and the second combination for the additional sub-component of the design layout.

18. The system of claim 11, wherein the operational parameters comprise a deviation in a real world operation of the battery cells and the electrical components from a theoretical performance of the battery cells and the electrical components.

19. The system of claim 11, further comprising:
one or more repositories configured to store the operational parameters of the batch of battery cells and the operational parameters of the electrical components; and
a battery design tool configured to:
store a plurality of design layouts of different configurations of the one or more battery cells and the one or more electrical components;
store theoretical performance information of the one or more battery cells and the one or more electrical components;
determine a deviation of the actual performance of the batch of battery cells from the theoretical performance of the batch of battery cells; and
determine a deviation of the actual performance of the one or more electrical components from the theoretical performance of the one or more electrical components,
wherein the selecting comprises selecting the at least one battery cell and the at least one electrical component based on the deviation of the actual performance of the batch of battery cells from the theoretical performance of the batch of battery cells, and the deviation of the actual performance of the one or more electrical components from the theoretical performance of the one or more electrical components.

20. The system of claim 11, wherein the operations further comprise selecting, from the batch of battery cells and electrical components a different combination of at least one battery cell and at least one electrical component and then repeating the comparing of the operational parameters and the determining that the operational parameters of the at least one battery cell and the at least one electrical component of the different combination match, and wherein the operation of selecting the at least one battery cell and the at least one electrical component as a first combination for the design layout comprises selecting from among the combinations of the at least one battery cell and the at least one electrical component that match as a first combination for the design layout.

21. The system of claim 11, wherein the operational parameters that are compared and determined to match are a statistical measure of deviation.

22. A non-transitory computer readable medium storing instructions for causing one or more processors to perform operations comprising:
determining a design layout of a battery, wherein the design layout comprises an electrical arrangement of one or more battery cells and one or more electrical components, distinct from but electrically connected in the design layout to the one or more battery cells, to produce a desired performance of the battery;
determining operational parameters of a batch of battery cells and operational parameters of electrical components useable in the battery, wherein determining the operational parameters comprises directing testing, with testing equipment including one or more sensors, of the operational parameters of the battery cells and the operational parameters of the electrical components;
selecting, from the batch of battery cells and electrical components, at least one battery cell and at least one electrical component for the electrical arrangement of the design layout;
comparing the operational parameters of the at least one battery cell and the operational parameters of the at least one electrical component;
determining, based at least partially on the comparison, that the operational parameters of the at least one battery cell and the operational parameters of the at least one electrical component match by each being within a predetermined threshold, wherein determining that the operational parameters of the at least one battery cell and the operational parameters of the at least one electrical component match comprises determining that the operational parameters of the at least one battery cell are within a predefined threshold of the operational parameters of the at least one electrical component in order for the operational parameters of the at least one battery cell to match the operational parameters of the at least one electrical component;
selecting the at least one battery cell and the at least one electrical component as a first combination for the design layout; and
providing an indication of the first combination.

23. The non-transitory computer readable medium of claim 22, the operations further comprising:
receiving, from a user, the desired performance of the battery; and
generating the design layout that produces the desired performance of the battery.

24. The non-transitory computer readable medium of claim 22, wherein determining the operational parameters further comprises:
measuring the operational parameters of the one or more battery cells and the operational parameters of the one or more electrical components.

25. The non-transitory computer readable medium of claim 22, the operations further comprising:
determining, for the design layout, a sub-component of the design layout, wherein the sub-component comprises a related electrical arrangement of one or more battery cells and one or more electrical components;
associating the first combination with the sub-component;
determining, for the design layout, an additional sub-component of the design layout, wherein the additional sub-component comprises a related electrical arrangement of one or more battery cells and one or more electrical components; and determining a second combination for the additional sub-component; determining equivalent operational parameters for the first combination and the second combination;

comparing the equivalent operational parameters of the first combination and the second combination;

determining, based at least partially on the comparison, that the equivalent operational parameters of the first combination and the second combination are within a predetermined threshold; and selecting the first combination for the sub-component and the second combination for the additional sub-component of the design layout.

26. The non-transitory computer readable medium of claim 22, wherein the operations further comprise selecting, from the batch of battery cells and electrical components a different combination of at least one battery cell and at least one electrical component and then repeating the comparing of the operational parameters and the determining that the operational parameters of the at least one battery cell and the at least one electrical component of the different combination match, and wherein the operation of selecting the at least one battery cell and the at least one electrical component as a first combination for the design layout comprises selecting from among the combinations of the at least one battery cell and the at least one electrical component that match as a first combination for the design layout.

27. The non-transitory computer readable medium of claim 22, wherein the operational parameters that are compared and determined to match are a statistical measure of deviation.

* * * * *